July 29, 1924.
E. A. MITCHELL
MEANS FOR CONTROLLING FLOW AND PRESSURE OF FLUID IN FLUID
DISTRIBUTING SYSTEMS
Filed Aug. 8, 1922 2 Sheets—Sheet 1
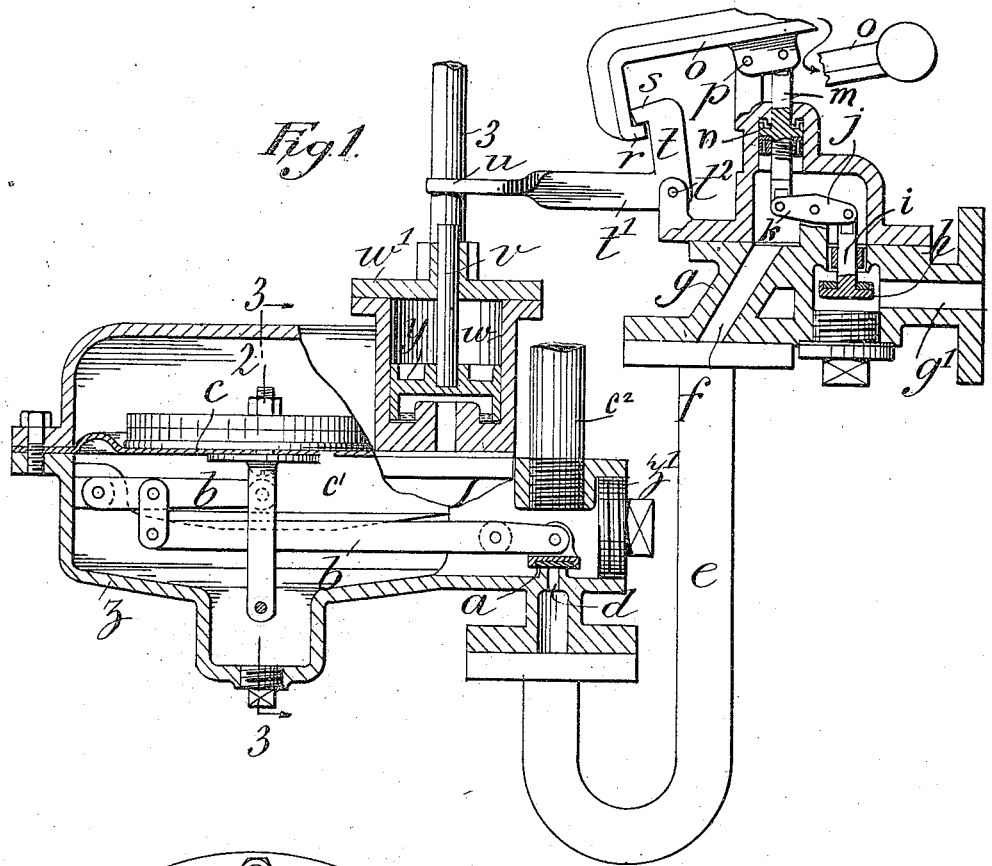
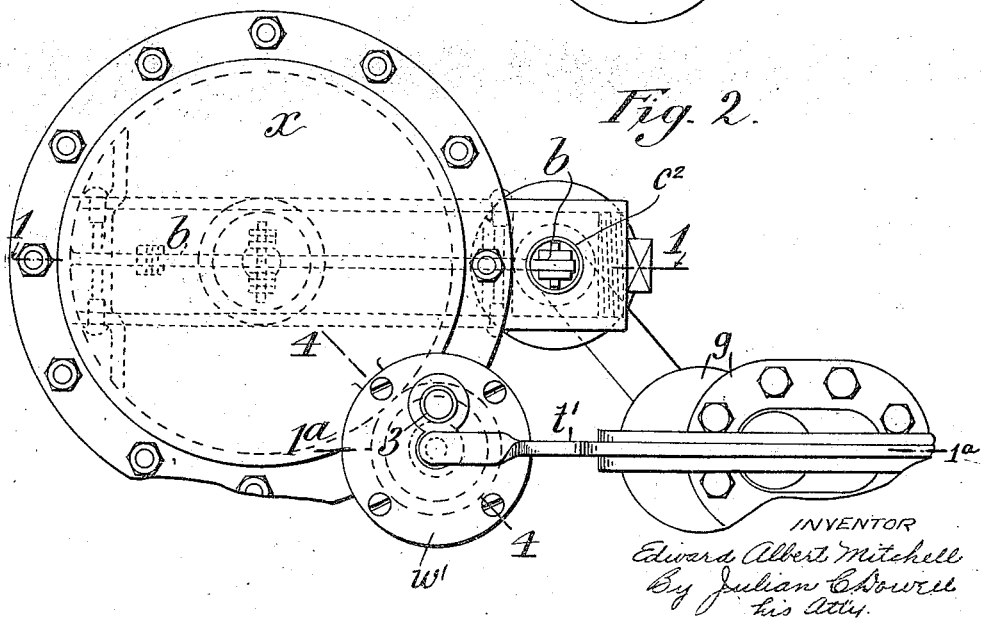

July 29, 1924.　　　　　　　　　　　　　　　1,503,329
E. A. MITCHELL
MEANS FOR CONTROLLING FLOW AND PRESSURE OF FLUID IN FLUID
DISTRIBUTING SYSTEMS
Filed Aug. 8, 1922　　　　2 Sheets-Sheet 2
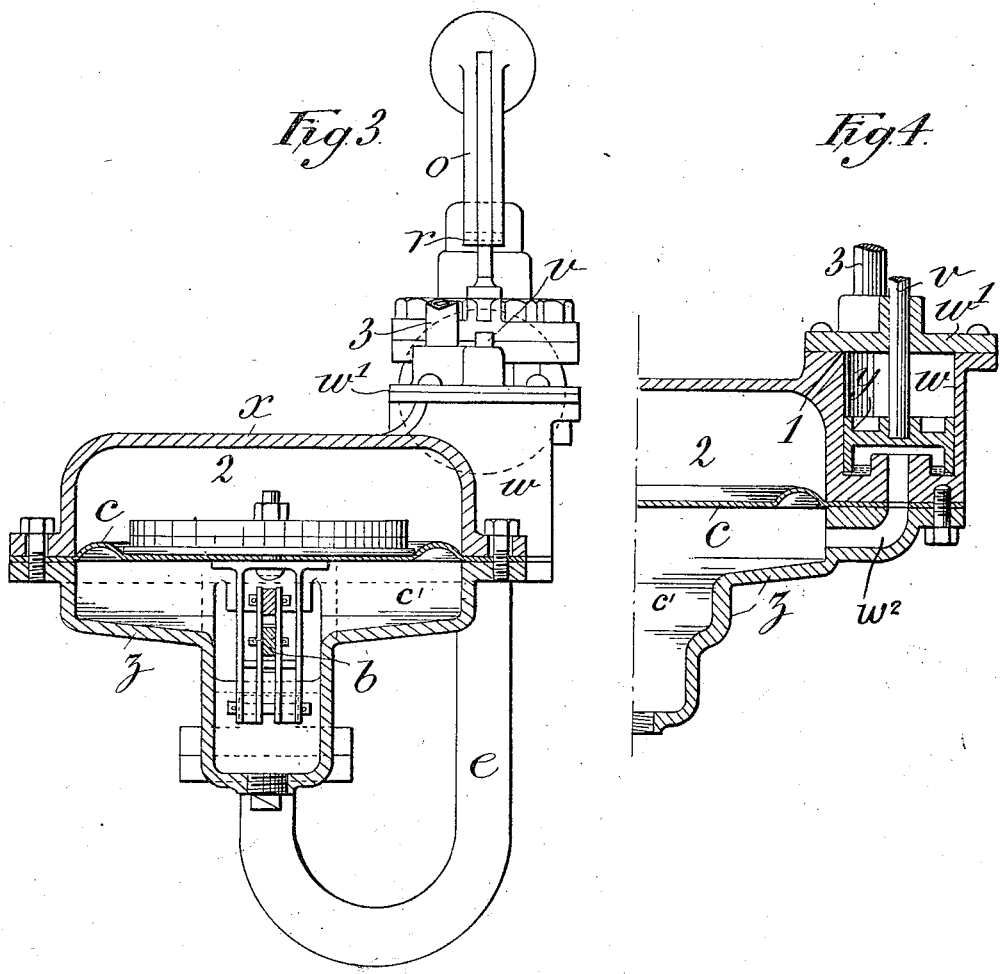
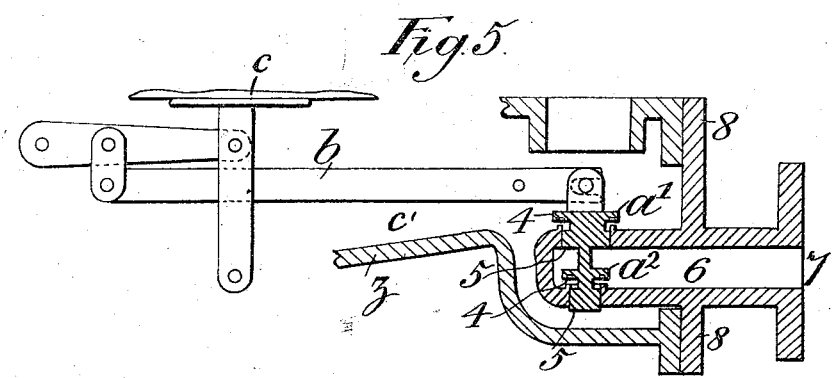
INVENTOR
Edward Albert Mitchell
By Julian C. Dowell
his Atty.

Patented July 29, 1924.

1,503,329

UNITED STATES PATENT OFFICE.

EDWARD ALBERT MITCHELL, OF LONDON, ENGLAND.

MEANS FOR CONTROLLING FLOW AND PRESSURE OF FLUID IN FLUID-DISTRIBUTING SYSTEMS.

Application filed August 8, 1922. Serial No. 580,549.

*To all whom it may concern:*

Be it known that I, EDWARD ALBERT MITCHELL, a subject of the King of Great Britain and Ireland, residing at London, England, have invented Improvements in Means for Controlling Flow and Pressure of Fluid in Fluid-Distributing Systems, of which the following is a specification.

This invention relates to means for controlling the flow of fluid from one part of a distributing system to another, involving the use of a pressure reducing valve, operating automatically.

Numerous forms and arrangements of diaphragm governors have been proposed designed to meet specific requirements in various services and it is fully recognized that some of the elements to be hereinafter referred to, are to be found employed in many different combinations.

The object of the present invention, which is directed more particularly to systems wherein gas is distributed at high pressure and consumed at a lower pressure, is to provide for the effectual isolation of any portion of such a system in which, by reason of unnatural conditions, the pressure at the consumption side of the governor valve is abnormally augmented. This is achieved by arranging that the gas or high pressure fluid before it reaches the pressure reducing valve of the governor shall pass through a stop valve, adapted to be held open by mechanical means until such time as the pressure in the governor is so far unduly increased as to displace a trip device. In this way whilst the pressure reducing valve is left free to function simply as a regulator, which is highly desirable, the isolation of a section of the system, due to mishap, is at once complete and cannot be impaired except by the act of a person deliberately exercised.

In the event therefore of a rupture of the pipe leading from the governor to the consumer, or of failure of the pressure reducing valve to close by reason of the presence of an obstruction, or to disturbance of the normal pressure conditions existing at opposite sides of the diaphragm of the governor, for instance due to perforation of such diaphragm, there can be no sustained leakage of fluid from the high pressure side of the system. The governor mechanism is of such a simple character that it can immediately be re-set without difficulty as soon as the defect which caused the trip to operate has been rectified, and the faulty section will continue to be out of use as long as it remains unattended, which in large areas, may be for somewhat protracted periods.

In its preferred form, apparatus according to the invention comprises a high pressure valve, a pressure reducing valve, a governor casing, and a cylindrical chamber containing a vertically movable liquid sealed piston, the said chamber being in communication with the side of the governor wherein the diaphragm is exposed to the pressure of the gas being consumed and also, at the opposite side of the piston, with the external atmosphere and with the governor at the opposite side of the diaphragm, there being combined therewith a loaded lever controlling the high pressure inlet valve and a pivoted detent or trip device having one arm adapted to engage the loaded lever and its opposite arm adapted to be engaged by a rod projecting from the said piston.

In the accompanying drawings, Fig. 1 is a sectional elevation and Fig. 2 a plan of one constructional form of apparatus according to the invention, the part section in Fig. 1 corresponding to the lines 1—1 and 1ª—1ª of Fig. 2. Fig. 3 is a central vertical section on the line 3—3 of Fig. 1 looking in the direction of the arrow. Fig. 4 is a section on the line 4—4 of Fig. 2 Fig. 5 is a fragmentary view similar to Fig. 1 showing a modified construction of a detail.

As shown in Figs. 1 to 4, the governor portion of the apparatus has an unbalanced pressure reducing valve $a$ connected by a power multiplying lever system $b$ to a loaded diaphragm $c$, the inlet $d$ to the said pressure reducing valve communicating through a branch pipe $e$ with the outlet $f$ of a high pressure valve comprising a valve body or casing $g$, having a high presure inlet $g^1$ for connection to a high pressure main pipe and a high pressure valve $h$. The high pressure valve $h$ has a stem $i$ connected to one arm $j$ of a rocking lever the oposite arm $k$ of which is jointed to a rod $m$ passing through a stuffing box $n$ and having a loose connection with a weighted lever $o$ pivoted at $p$ to the valve body $g$. The non-weighted arm of the latter lever has a hook-like catch $r$ companion to a similar catch $s$ on one arm $t$ of a second lever $t\ t^1$ pivoted at $t^2$ to the valve body and constituting the locking detent or trip device, the second arm $t^1$ of the detent lever having its end $u$ extending over the upwardly extending end of a piston rod $v$ protruding through the cover $w^1$ of a cylindrical chamber $w$ cast in the cover $x$ of the governor casing $z$ and containing the vertically movable liquid sealed piston $y$. The lower end of the chamber $w$ communicates through a passage $w^2$ in the governor casing $z$ with the gas chamber $c'$ located below the diaphragm $c$ and into which gas at the required lower pressure is admitted by the pressure reducing valve $a$. $c^2$ is the gas outlet service pipe for delivering gas from the gas chamber $c'$ to the consumers' supply main. The high pressure valve body $g$ may be made separate from the governor casing $z$. The pressure reducing valve $a$, is arranged near one side of the governor casing, which is provided with an opening, normally closed by a removable screw plug $z^1$, so that access can be readily gained to such valve when necessary. 1 (Fig. 4) is a passage connecting the space 2 of the governor with the chamber $w$ and thence through a pipe 3 with the external atmosphere so that the pressure within the said space 2 will correspond to that of the external atmosphere. This arrangement also enables any gas that may leak past the diaphragm $c$ to escape to the external atmosphere.

When, as shown in Fig. 5, the pressure reducing valve is a balanced one, it may comprise two discs $a^1$ $a^2$ provided with rubber or other joint rings 4 and connected to guides 5 arranged to slide in opposite openings in a horizontal tubular support 6 closed at one end and having a high pressure gas inlet 7 at the other end. The said tubular support 6 may be provided with a flange 8 detachably secured to the side of the governor casing $z$ over an opening therein through which the said tubular support, with balanced valve, can be inserted and through which it can be easily withdrawn for inspection or renewal of the valve, when this may become necessary. The operation of the apparatus is as follows:—At starting, the high pressure gas valve $h$ is opened by lifting the right hand end of the lever $o$ and held in its open position by engaging the catch $r$ on its left hand end with the catch $s$ on the arm $t$ of the detent lever $t, t'$. High pressure gas is thereby delivered to the pipe $e$ and thence past the pressure reducing valve $a$ into the gas chamber $c'$ at the required reduced pressure whence it can flow, at such reduced pressure, through the outlet pipe $c^2$ to the low pressure distributing mains. The pressure reducing valve $a$ and loaded diaphragm $c$ functions in the ordinary way to maintain the gas in the gas chamber $c'$ at substantially the required lower pressure. Should for any of the reasons hereinbefore mentioned, the pressure in the gas chamber be abnormally augmented, the pressure will be transmitted to and lift the liquid sealed piston $y$ in cylinder $w$ so as to cause its rod $v$ to trip the detent lever $t\ t^1$ and release the weighted lever $o$ so as to permit the same to close the high pressure valve $h$ thus cutting off the supply of high pressure gas to the governor until the cause that brought about the closing of the high pressure valve has been rectified.

What I claim is:—

1. For controlling the flow of fluid in a distributing system, a governor embodying a pressure reducing valve, a stop valve through which the high pressure fluid passes before reaching the pressure reducing valve, mechanical means set normally to hold the stop valve open, and tripping means, responsive to pressure in excess of a predetermined value in the governor, adapted to permit the stop valve to close and remain closed.

2. For controlling the flow of fluid in a distributing system, means comprising a high pressure valve, a pressure reducing valve, a diaphragm governor casing enclosing the latter valve, a chamber containing a movable member with protruding rod, the said chamber being in communication at one side of the piston therein with the side of the governor wherein the diaphragm is exposed to the pressure of the fluid issuing therefrom, and at the opposite side of the movable member, with the external atmosphere, the space within the governor casing at the opposite side of the diaphragm being also in communication with the external atmosphere, a loaded lever controlling the high pressure inlet valve and a pivoted detent having one arm adapted to engage the loaded lever and its opposite arm adapted to be engaged by the piston rod.

3. For controlling the flow of fluid in a distributing system, a governor comprising a casing, a diaphragm dividing the interior of said casing into two chambers one, a gas chamber, having an inlet for high pressure gas and an outlet for low pressure gas, and the other being in communication with the external atmosphere, multiplying lever mechanism located in the gas chamber and connected to said diaphragm, a pressure reducing valve connected to said mechanism and controlling said high pressure gas inlet, a high pressure valve the casing of which has its outlet connected to the inlet of said gas chamber, a weighted lever adapted, when free, to close said high pressure valve, a vertical cylinder carried by the diaphragm casing and having one end in communication with the said gas chamber and the other end in communication with the external atmosphere, a piston, normally liquid sealed, arranged in said cylindrical chamber and having a rod extending therefrom and a trip lever having one arm normally holding the weighted lever and high pressure valve in the open position and another arm arranged in the path of the piston rod for tripping said lever and closing said high pressure valve.

Signed at American Consulate General, London, this 14th day of July, 1922.

EDWARD ALBERT MITCHELL.